G. E. PALMER.
METER CONNECTION BLOCK.
APPLICATION FILED JUNE 6, 1910.
978,636.
Patented Dec. 13, 1910.
4 SHEETS—SHEET 1.
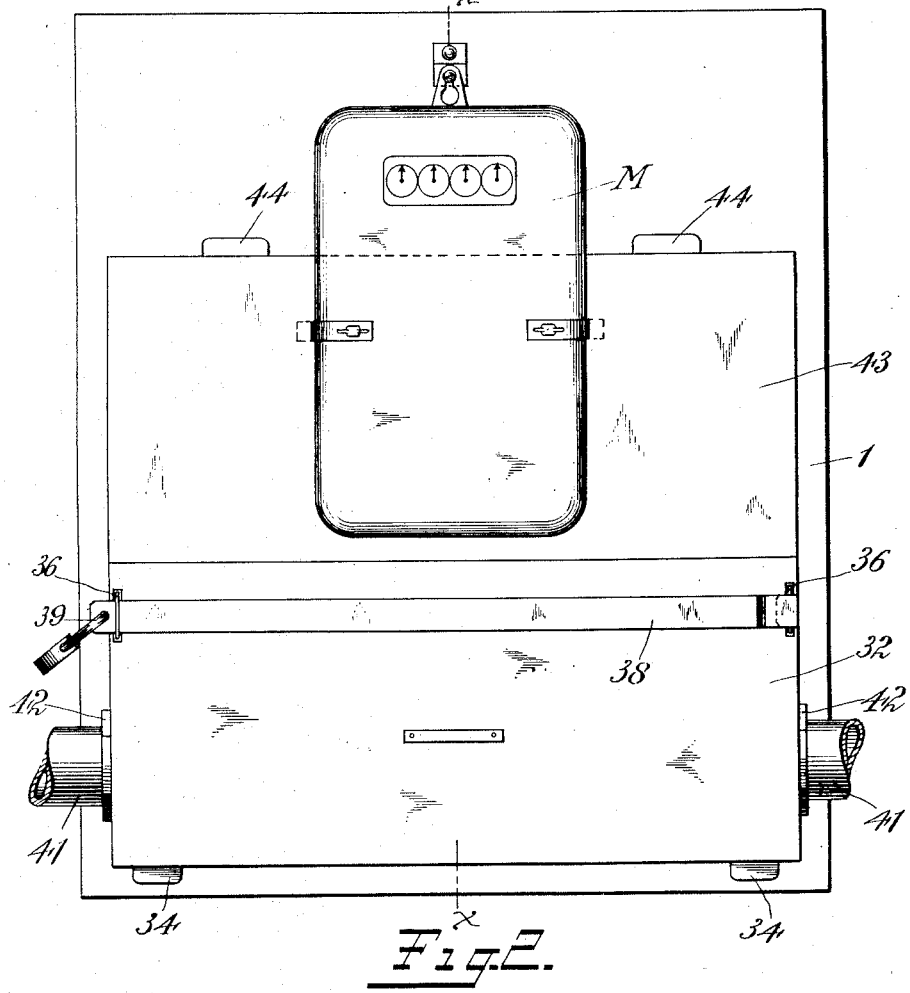
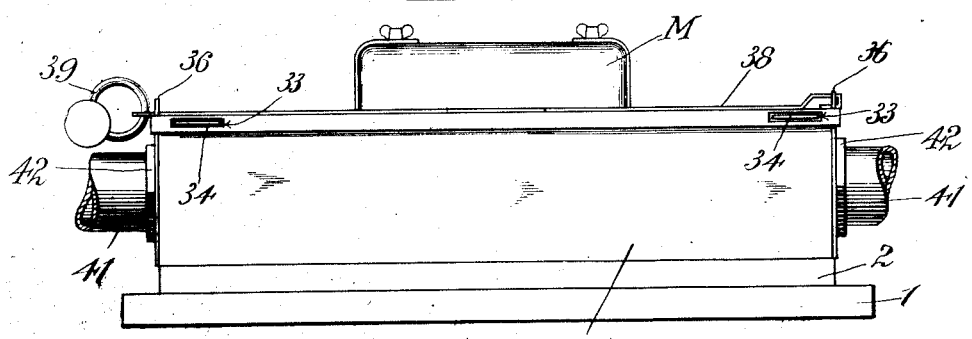
Witnesses:
Fred K. M. Dannenfelser
Chas. A. Beard
Inventor
G. E. PALMER
By his Attorneys
Bartlett, Brownell & Mitchell G. E. PALMER.
METER CONNECTION BLOCK.
APPLICATION FILED JUNE 6, 1910.
978,636.
Patented Dec. 13, 1910.
4 SHEETS—SHEET 2.
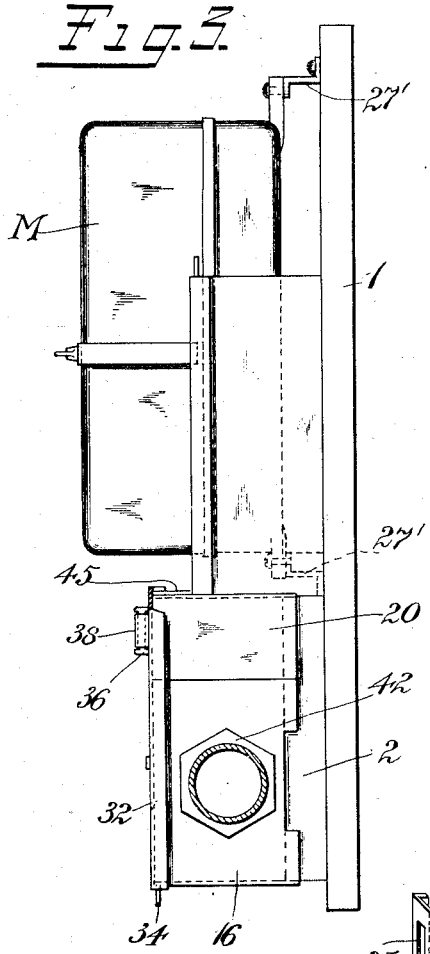
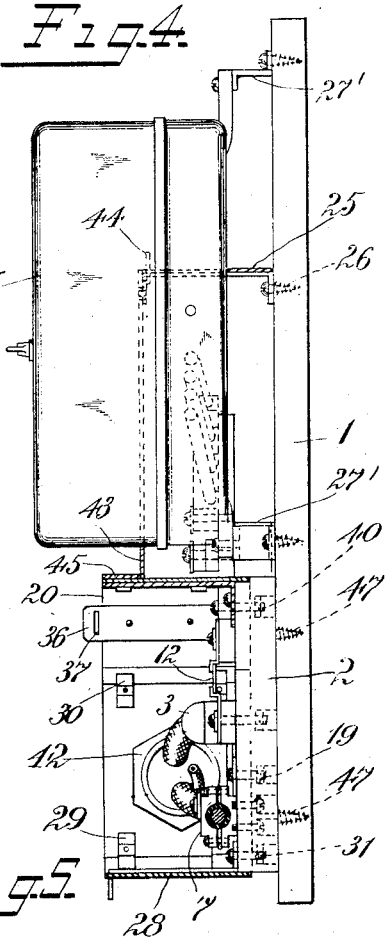
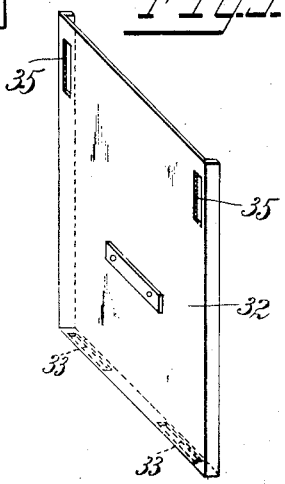
Witnesses:
Fred K. M. Dannenfelser
Chas. A. Peards
Inventor
G. E. PALMER
By his Attorneys
Bartlett, Brownell, Mitchell

G. E. PALMER.
METER CONNECTION BLOCK.
APPLICATION FILED JUNE 6, 1910.

978,636.

Patented Dec. 13, 1910.
4 SHEETS—SHEET 3.

Witnesses:
Fred K. W. Dannenfelser
Chas N Pinch

Inventor
G. E. PALMER
By his Attorneys
Bartlett Brownell Mitchell

G. E. PALMER.
METER CONNECTION BLOCK.
APPLICATION FILED JUNE 6, 1910.
978,636.
Patented Dec. 13, 1910.
4 SHEETS—SHEET 4.
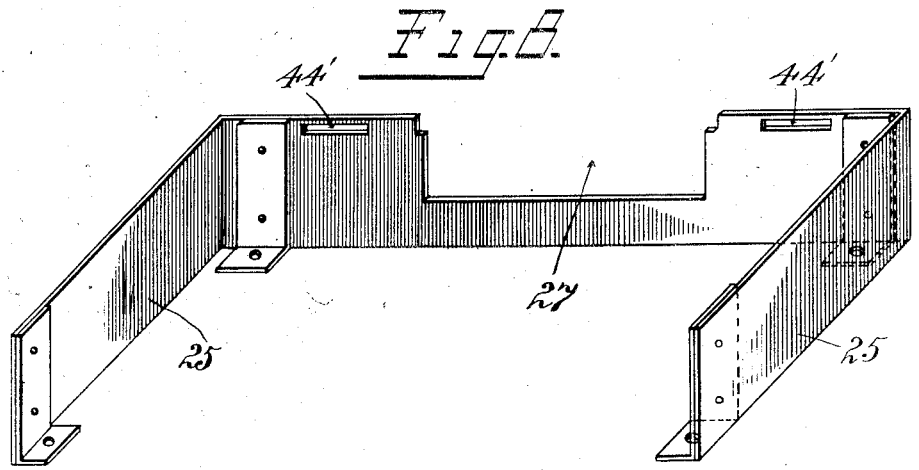
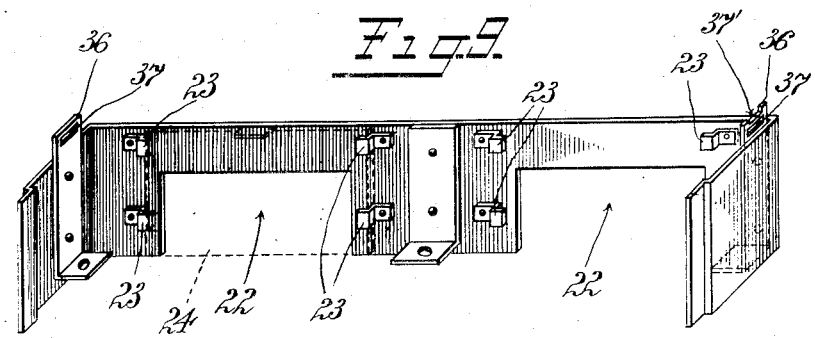
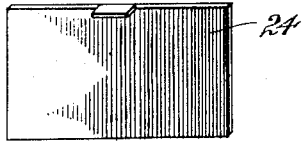
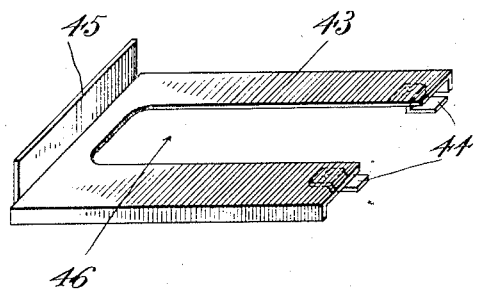
Witnesses:
Fred K. M. Dannenfelser
Chas. A. Peard
Inventor
G. E. PALMER
By his Attorneys
Bartlett, Brownell & Mitchell

UNITED STATES PATENT OFFICE.

GRANVILLE E. PALMER, OF WINCHESTER, MASSACHUSETTS.

METER-CONNECTION BLOCK.

978,636.

Specification of Letters Patent. Patented Dec. 13, 1910.

Application filed June 6, 1910. Serial No. 565,200.

*To all whom it may concern:*

Be it known that I, GRANVILLE E. PALMER, a citizen of the United States, residing at Winchester, county of Middlesex, State of Massachusetts, have invented certain new and useful Improvements in Meter-Connection Blocks, of which the following is a full, clear, and exact description.

My invention relates to an improvement in meter connection blocks, and has for its object to provide a new and improved incased meter connection block.

It further has for its object to provide a new and improved means for completely sealing such a block when the meter is connected or disconnected.

It further has for its object to provide a block having a sectional casing, parts of which may be removed in order to obtain easy access to the conductors within.

The following is a description of an embodiment of my invention, reference being had to the accompanying drawings, in which—

Figure 6:
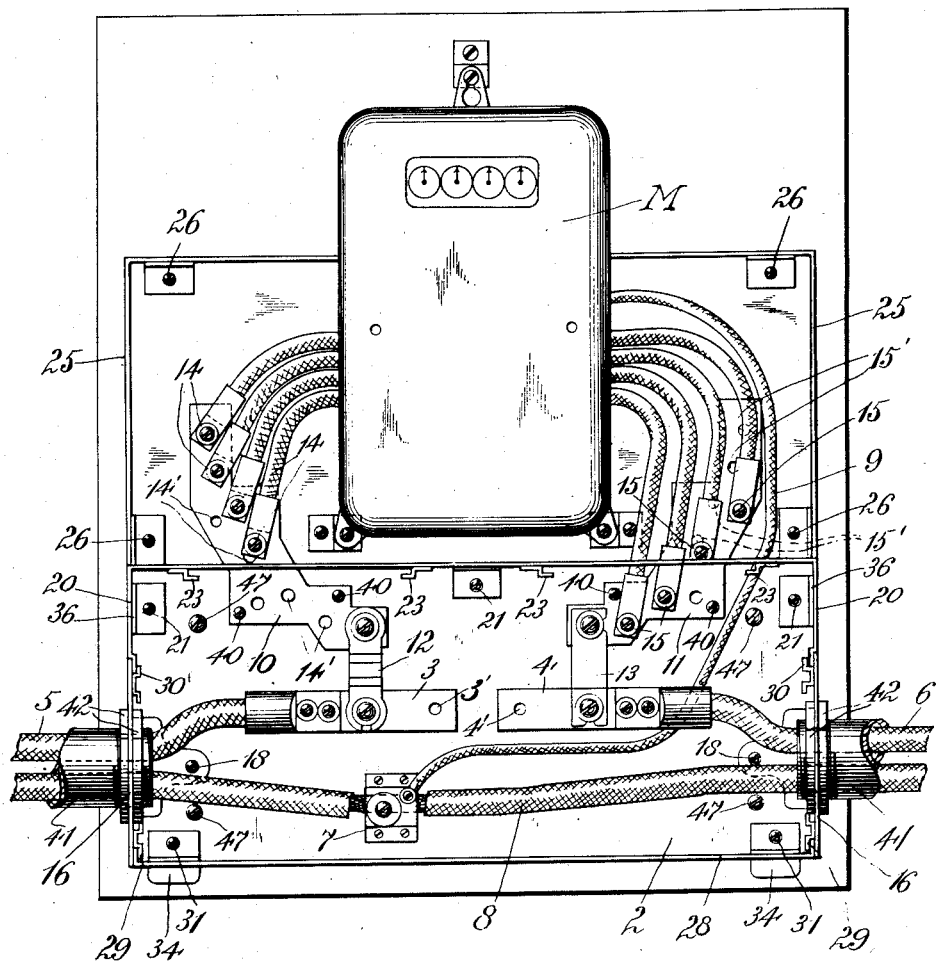
Figure 7:
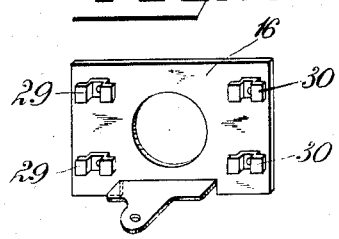

Figure 1 shows a front elevation of the meter connection block, together with a meter and casing for the meter terminals. Fig. 2 is a bottom view of the same. Fig. 3 shows a side elevation of the parts of Fig. 1. Fig. 4 shows a transverse section of the casing of the device of Fig. 1 on the line $x$—$x$, the meter and insulating base being in full. Fig. 5 shows in perspective a cover for the casing of the meter connection block. Fig. 6 is a view of the parts of Fig. 1, with the covers removed. Fig. 7 represents in perspective one of the exit and entrance ports. Fig. 8 shows in perspective the wall for the casing of the meter terminals. Fig. 9 shows in perspective the upper wall of the incased meter block. Fig. 10 shows in detail a closing slide coacting with said upper wall. Fig. 11 shows a cover for the wall surrounding the meter terminals.

Referring more particularly to the drawings, 1 (Figs. 4 and 6) is a base, preferably of wood.

2, (Figs. 4 and 6) is a meter connection block of porcelain or other similar insulating material. Upon this porcelain block are secured circuit terminals 3—4 connected to the leads 5—6. These terminals are provided with screw-threaded holes 3'—4', whereby a short-circuiting conductor can be secured thereto. 7 is a terminal also secured to said block and electrically connected with the lead 8, the same being for the purpose of connecting the meter shunt 9.

10—11 are terminal plates which are connected to the terminals 3—4 respectively by removable conductors 12—13, the conductor 12 connected to the incoming lead being preferably a fuse. The plate 10 is provided with screw threaded openings for receiving screws 14—14, which secure one set of terminals of a meter M to the plate 10. The plate 11 is provided with screw-threaded openings for receiving screws 15 for securing to said terminal plate the other set of terminals of the meter M. The plate 10 is provided with a second set of screw-threaded openings 14' for securing meter terminals of a different length. The plate 11 is provided with a second set of screw-threaded openings 15' for securing other meter terminals of different lengths. To the meter connection block 2 are secured wall plates 16 — 16 provided with openings through which the conductors 5, 6 and 8 enter and leave the connection block casing. These plates 16—16 are secured to the block 2 by screws 18—18 engaging nuts 19 on the rear side thereof, which nuts are held in place by insulating cement.

To the upper side of the block a U-shaped wall 20 is secured by screws 21 passing through lugs secured to said wall and engaging screw-threaded nuts on the rear of said block 2. This U-shaped wall shown in perspective in Fig. 9 has openings 22, through which the plates 10 and 11 extend. It is also provided with lugs 23 above which the slides 24 may be inserted so as to be supported, thereby closing the openings 22 so as to seal the casing when the meter and its terminal casing are removed.

25 is a wall of the meter terminal casing secured to the backing 1 by screws 26 passing through lugs secured to the wall, this wall having a cut-away portion 27 for receiving the meter M. The meter is raised from the backing 1 by supports 27', so that the narrow portion of the wall 25 can pass behind the meter.

28 is the bottom portion of the meter connection block casing. It is provided with upturned ends which pass beneath recesses formed by lugs 29 secured to the plates 16. The lower ends of the U-shaped wall 20 pass behind similar lugs 30, also secured to said plates 16, forming pockets into which the ends of the wall 20 enter. The lower wall 28 is secured to the meter block by screws 31 passing through lugs secured to said wall and engaging screw-threaded nuts on the rear of the block. The meter connection block is covered by a cover 32, which rests upon the upper edges of the walls 20 and 28 and the plates 16. The cover 32 is provided with two openings 33, which pass over projections 34 secured to the wall 28 and with openings 35 which pass over projections 36 secured to the upper wall 20. The projections 36 have openings 37 therein, through which pass a securing bar 38, which is held in position by a seal 39. When the cover 32 is placed in position, the openings 33 are first passed over the projections 34, whereupon the openings 35 are passed over the projections 36—36. The bar 38 is then passed through the openings 37 and secured by the seal 39, thus preventing unauthorized access to the meter connection block. The bar 38 is straight at one end and doubled under at the other end, so that it can be inserted with a slight longitudinal movement where space is limited. The projection 36 at the doubled end is provided with a notch 37' which assists in holding that end of the bar 38. The seal 39 passes through the straight end of the bar.

If the meter M and wall 25 are removed, and it is desired to seal the meter connection block casing, the plates 10 and 11 are removed by taking out the screws 40 and placed in the bottom of the meter block casing. The slides 24 are then slipped in place so as to cover the openings 22, as indicated in dots in Fig. 9. The meter connection block cover 32 is then put in place, together with its securing bar 38, and upon sealing the securing bar 38 by the seal 39 the meter connection block is entirely sealed so as to prevent unauthorized access thereto.

When it is desired to install a meter, the wall 25 is secured to the backing 1, the plates 10 and 11 are secured in place as shown in Fig. 6, the meter is secured to the wall and the meter terminals are secured to the plates 10 and 11 by the screws 14 and 15 as shown.

Meters of various makes or various styles have terminals of different lengths, and in order to permit either of two meters having terminals of different lengths to be easily secured to the plates 10 and 11, a second set of screw-holes 14' 15' is made in the blocks 10 and 11 respectively, at the proper distances for securing terminals of different standard lengths.

In order that the conductors leading to the meter may be inclosed, I provide conduits 41, which are secured in the openings in the plates 16 by nuts 42.

With large meters particularly it is oftentimes desirable to remove portions of the meter connection block casing so as to permit ready access to the conductors. With my construction this is easily accomplished by removing either or both walls 20 and 28, which removal can be made upon unscrewing the screws 21—31, without disturbing the plates 16 through which the leads enter and leave the casing. To completely cover the meter terminals I provide a cover 43 having projections 44 and a flange 45, and also an opening 46 for the meter. The upper part of the wall 25 is provided with openings 44' through which the projections 44 extend. In order to cover the meter terminals, the projections 44 are inserted through those openings and the cover 43 is then brought into engagement with the top of the wall 25. The flange 45 extends outwardly so as to be flush with the upper part of the wall 20 and be engaged by the cover 32 when the same is in place. In order to seal the meter, therefore, after the same is installed, the cover 43 is put in place, the cover 32 is then put in place, and the bar 38 inserted and sealed. This bar then holds the covers 32 and 43 in position so as to prevent any unauthorized access to either the meter or the meter connection block.

By substituting different shaped walls for the wall 25 and covers 43 corresponding to different meters which may be used, various meters may be used in connection with a given meter connection block, the covers thereto being sealed in the manner shown by the sealing of the bar 38. The meter connection block is secured to the backing by the wood screws 47, the removal of which permits the meter connection block and the casing secured thereto to be entirely removed from the backing 1, the casing being carried directly by the meter connection block.

The apparatus is simple in construction and easy of installation, and when installed not only affords ready authorized access to the parts, but provides for a simple and secure sealing of either the meter connection block alone or the meter connection block when used with various forms of meter.

What I claim is:

1. In an incased meter-connection-block, the combination of an insulating block, a sectional wall secured thereto consisting of top and bottom members, and inlet and outlet members separating said top and bottom members, each of said members being independently secured to said insulating block, and a cover supported by said wall.

2. In an incased meter-connection-block, the combination of an insulating block, a sectional wall secured thereto consisting of top and bottom members, and inlet and outlet members separating said top and bottom members, each of said members being independently secured to said insulating block, terminal plates secured to said block and extending through said top member, the same being cut away to permit said terminal plates to extend, and a cover supported by said wall.

3. In an incased meter-connection-block, the combination of an insulating block, a sectional wall secured thereto consisting of top and bottom members, and inlet and outlet members separating said top and bottom members, each of said members being independently secured to said insulating block, a removable terminal plate secured to said block and extending through said wall, said top member being cut away to permit said plate to extend, and having means for supporting a slide to close the opening therethrough, and a cover supported by said wall.

4. In an incased meter-connection-block, the combination of an insulating block, a sectional wall secured thereto consisting of top and bottom members, and inlet and outlet members separating said top and bottom members, each of said members being independently secured to said insulating block, terminal plates secured to said block and extending through said wall, said terminal members having a plurality of sets of screw-holes corresponding to the lengths of conductors on different meters, and a cover supported by said wall.

5. The combination of a backing, an insulating block, circuit terminals secured theerto, circuit conductors leading thereto, removable terminal plates also secured to and extending beyond said insulating block, removable connections between said circuit terminals and said terminal plates, a metallic wall surrounding said block and cut away so as to permit the extension of said terminal plates and the passage of the conductor secured thereto, means for securing said insulating block to the backing, and a cover secured to said wall.

6. The combination of a backing, an insulating block, circuit terminals secured thereto, circuit conductors leading thereto, removable terminal plates also secured to and extending beyond said insulating block, removable connections between said circuit terminals and said terminal plates, a metallic wall secured to said block and having openings through which said terminal plates and some of the circuit conductors secured thereto extend, and means for securing said insulating block to said backing, said terminal plates having two sets of screw-holes, there being a plurality of holes in each set spaced for the terminals of different meters.

7. The combination of a backing, an insulating block, circuit terminals secured thereto, circuit conductors leading thereto, terminal plates also secured to said block and extending beyond said insulating block, removable connections between said circuit terminals and said terminal plates, a metallic wall secured to said block and having openings through which said terminal plates and the said circuit conductors extend, means for securing said insulating block to said backing, a supplemental casing adjacent to said meter and to said wall and covering the outer ends of said terminal plates and the conductors leading from the meter to said terminal plates, and a cover secured to said wall.

GRANVILLE E. PALMER.

Witnesses:
H. A. HART,
M. H. GLYNN.